(12) United States Patent
Coushaine

(10) Patent No.: US 7,731,404 B2
(45) Date of Patent: Jun. 8, 2010

(54) LIGHT SOURCE

(75) Inventor: Charles M. Coushaine, Rindge, NH (US)

(73) Assignee: Osram Sylvania Inc, Danvers, MA (US)

( * ) Notice: Subject to any disclaimer, the term of this patent is extended or adjusted under 35 U.S.C. 154(b) by 144 days.

(21) Appl. No.: 12/072,207

(22) Filed: Feb. 25, 2008

(65) Prior Publication Data

US 2009/0213594 A1  Aug. 27, 2009

(51) Int. Cl.
G02B 6/04 (2006.01)
F21L 4/00 (2006.01)
F21V 29/00 (2006.01)

(52) U.S. Cl. .................. 362/554; 362/196; 362/570; 362/103

(58) Field of Classification Search .................. 362/554, 362/555, 570, 103, 108, 196, 294, 373
See application file for complete search history.

(56) References Cited

U.S. PATENT DOCUMENTS

| | | | | |
|---|---|---|---|---|
| 4,234,907 A * | 11/1980 | Daniel | ......................... | 362/556 |
| 5,099,399 A | 3/1992 | Miller et al. | | |
| 5,424,922 A * | 6/1995 | Wise | ........................... | 362/554 |
| 6,030,089 A * | 2/2000 | Parker et al. | ................. | 362/103 |
| 6,170,959 B1 * | 1/2001 | Richardson, III | ............ | 362/103 |
| 6,302,570 B1 * | 10/2001 | Petell et al. | .................. | 362/554 |
| 6,709,142 B2 * | 3/2004 | Gyori | ......................... | 362/554 |
| 6,957,905 B1 * | 10/2005 | Pritchard et al. | ............ | 362/554 |
| 2006/0221596 A1 * | 10/2006 | Chang | ......................... | 362/103 |
| 2008/0019659 A1 | 1/2008 | Tao et al. | | |

* cited by examiner

Primary Examiner—Stephen F Husar
Assistant Examiner—Peggy A. Neils
(74) Attorney, Agent, or Firm—William H. McNeill

(57) ABSTRACT

An illuminator (10) for a plurality of optical fibers (12). The illuminator (10) comprises a housing (14) that can be formed of two housing halves, (14a) and (14b) of a suitable material such as an opaque ABS plastic. First and second compartments (16, 18) are provided in the housing. A suitable battery (20) is contained within the first compartment (16) and a light source (22) is contained in the second compartment (18). The light source (22) is preferably a LED. The light source (22) is mounted upon a printed circuit board (24), which, in turn, can be mounted upon a heatsink (24a), for example, a black, anodized aluminum. An optical coupler (26) is associated with the light source (22) and comprises a central body (28) arrayed along a light source axis (30) and has a proximal end (32) with a lens (34) adjacent the light source (22) and a distal end (36). At least one lateral projection (38) (preferably, two) is formed on the central body (28), the lateral projection (38) including mounting means (40). The distal end (36) is formed to accept an optical fiber bundle (42) that has a body (42a) that preferably is polygonal in cross-section.

8 Claims, 3 Drawing Sheets

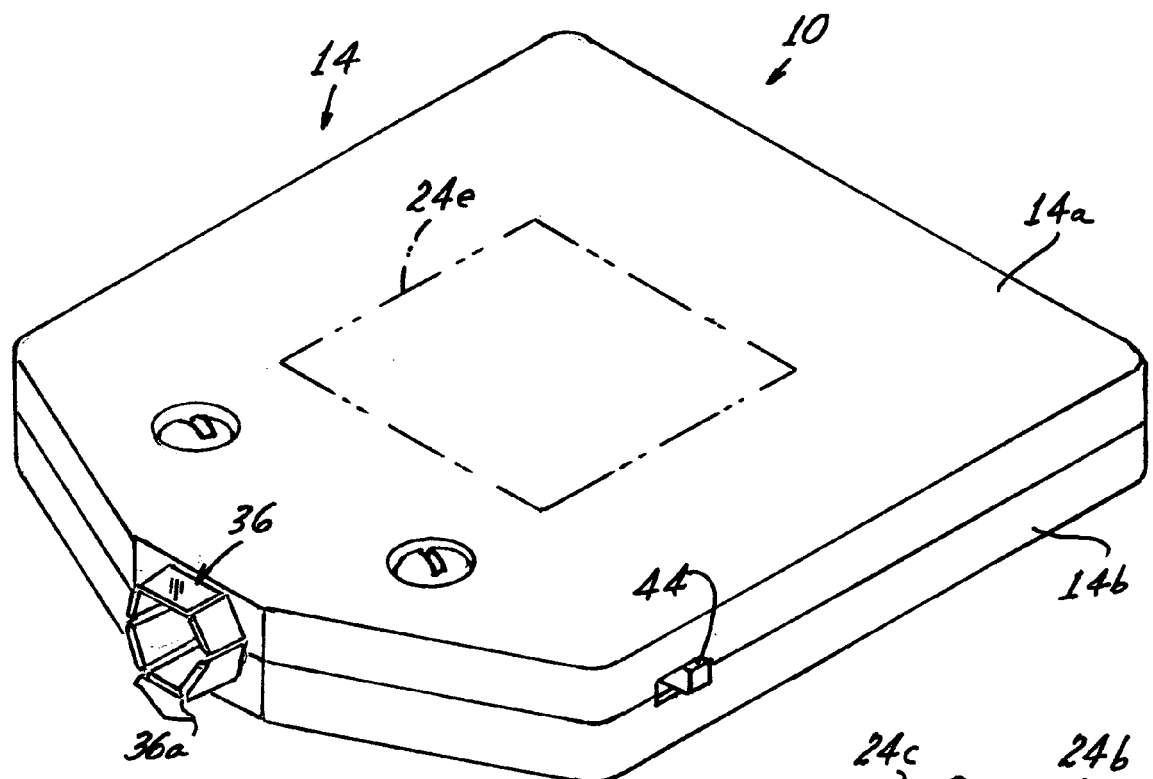
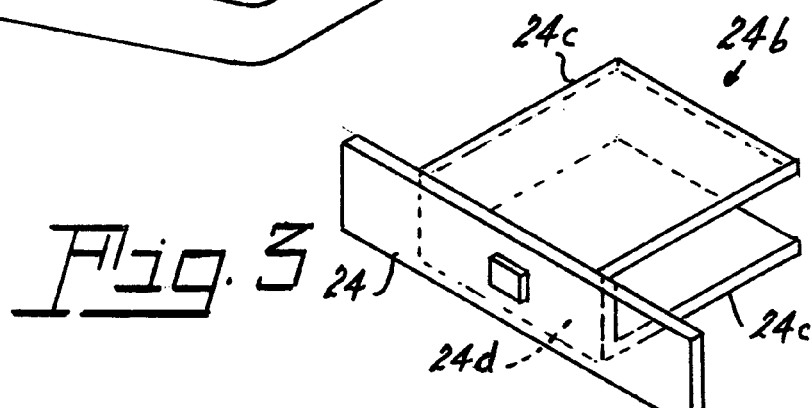

LIGHT SOURCE

TECHNICAL FIELD

This invention relates to illuminators and more particularly to illuminators for optical fibers. Still more particularly, it relates to illuminators for illuminating optical fibers in woven objects and to objects so illuminated.

BACKGROUND ART

The illumination of optical fibers for decorative purposes has been hindered by the lack of a convenient power source, or illuminator. Even the advent of light emitting diodes (LED or LEDs) with their small size and low power consumption has failed, so far, to solve this problem.

DISCLOSURE OF INVENTION

It is, therefore, an object of the invention, to obviate the disadvantages of the prior art.

It is another object of the invention to enhance optical fiber illuminators.

Yet another object of the invention is the improvement of optical illuminators and the products they illuminate.

These objects are accomplished, in one aspect of the invention, by an illuminator for a plurality of optical fibers comprising: a housing; first and second compartments in the housing; a battery in the first compartment and a light source in the second compartment deriving power from the battery, the light source being mounted upon a printed circuit board; an optical coupler associated with the light source, the optical coupler comprising a central body arrayed along a light source axis and having a proximal end with a lens adjacent the light source and a distal end; at least one lateral projection on the central body, the lateral projection including mounting means for affixing the optical coupler to the printed circuit board; the distal end being formed to accept an optical fiber bundle.

The objects are accomplished, in another aspect of the invention, by a method of illuminating a woven object comprising the steps of: forming a woven object with a plurality of optical fibers contained therein; combining one end of each optical fiber to form a fiber bundle; forming an illuminator comprising a housing having first and second compartments therein; installing a battery in the first compartment and a light source in the second compartment, the light source deriving power from the battery, the light source being mounted upon a printed circuit board; forming an optical coupler and associating the optical coupler with the light source, the optical coupler comprising a central body arrayed along a light source axis and having a proximal end with a lens adjacent the light source and a distal end; at least one lateral projection on the central body, the lateral projection including mounting means for affixing the optical coupler to the printed circuit board; inserting the fiber bundle into the distal end; and energizing the light source to illuminate the woven object.

The objects are accomplished, in yet another aspect of the invention, by the provision of an illuminable woven object comprising: a fabric; a plurality of optical fibers woven into the fabric; a common terminus for the plurality of optical fibers; and a pocket located adjacent the terminus.

The illuminator is compact and easy to use and adequately illuminates a plurality of optical fibers.

BRIEF DESCRIPTION OF THE DRAWINGS

FIG. 3 is a perspective view of an illuminator according to an aspect of the invention;

FIG. 6 is a perspective view of an alternate heat sink that can be employed with the invention.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
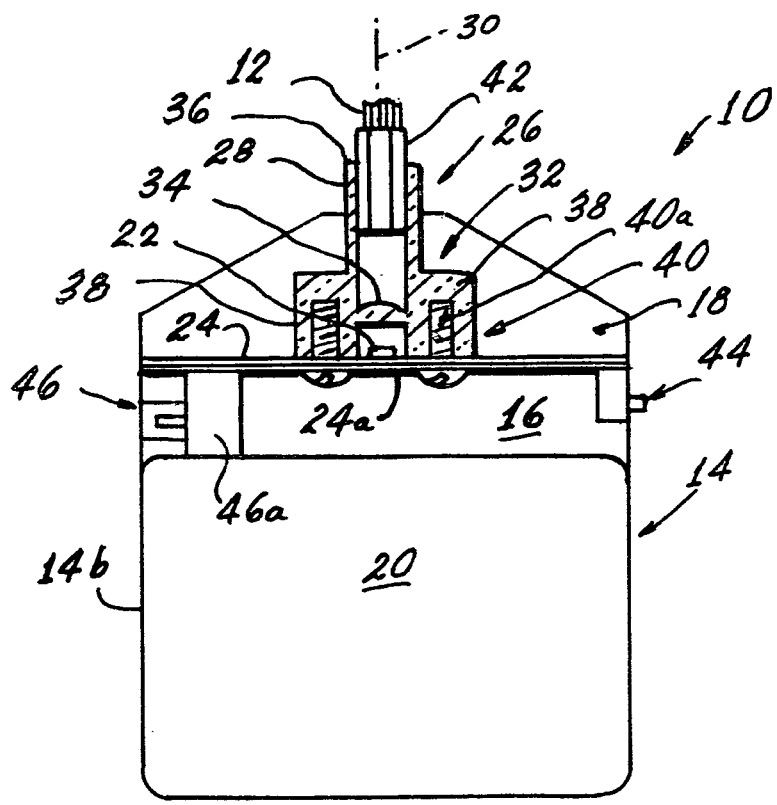
FIG. 1 is a plan view of an illuminator according to an aspect of the invention.

Referring now to the drawings with greater particularity there is shown in FIG. 1 an illuminator 10 for a plurality of optical fibers 12. The illuminator 10 comprises a housing 14 that can be formed of two housing halves, 14a and 14b of a suitable material such as an opaque ABS plastic. First and second compartments 16, 18 are provided in the housing. A suitable battery 20 is contained within the first compartment 16 and a light source 22 is contained in the second compartment 18. The light source 22 is preferably a LED that derives power from the battery 20. In a preferred embodiment the battery 20 is a Li-ion battery of 1250 mAh and 3.7V, for example a Yuntong YT723250 or equivalent. The light source 22 can be an OSRAM APT LW G6SP, available from OSRAM OPTO. The light source 22 is mounted upon a printed circuit board 24, such as an FR4, which, in turn, can be mounted upon a heatsink 24a, for example, a black, anodized aluminum. If required, a larger heatsink, such as 24b (shown in FIG. 6) can be employed. The heatsink 24b is substantially U-shaped with legs 24c and a bight 24d, upon which the printed circuit board 24 is mounted. The heatsink 24b can be accommodated within the housing 14 by providing the top and bottom of the housing 14 with cutouts 24e, one of which is shown in phantom lines in FIG. 3.

Figure 2:
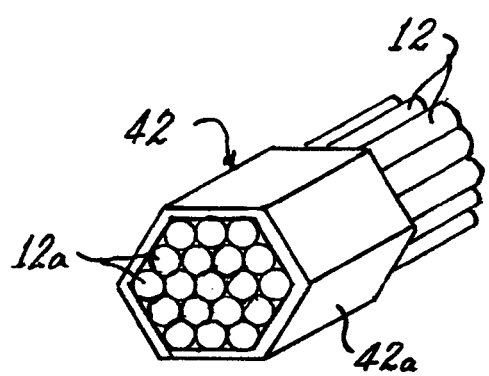
FIG. 2 is a perspective view of an optical fiber bundle.

An optical coupler 26 is associated with the light source 22 and comprises a central body 28 arrayed along a light source axis 30 and having a proximal end 32 with a lens 34 adjacent said light source 22 and a distal end 36. The optical coupler 26 is preferably formed from Rohm Plexiglass, Type 8N PMMA, or equivalent. At least one lateral projection 38 (preferably, two) is formed on the central body 28, the lateral projection 38 including mounting means 40, for example, self-threading screws 40a, for affixing the optical coupler 26 to the printed circuit board 24. The distal end 36 is formed to accept an optical fiber bundle 42 that is shown more clearly in FIG. 2. The bundle 42 has a body 42a that preferably is polygonal in cross-section, such as the hexagonal structure shown, to aid in alignment of the optical fibers. To aid in receiving the bundle 42 the distal end 36 can be provided with slits 36a along the edges, to provide a spring action.

A switch 44 is electrically connected between the battery 20 and the light source 22 for actuating and deactivating the light source 22 and a terminal 46 is provided for the reception of a connector to charge the battery 20. Appropriate re-charging circuitry can be contained in sub-housing 46*a*.

As can be seen from the illustrations, the proximal end 32 of the optical coupler 26 is contained within the opaque housing 14 (to act as shield to block unwanted stray light from the light source 22) and at least a portion of the distal end 36 extends beyond the housing 14 to receive the fiber bundle 42. To aid in the reception and retention of the fiber bundle 42 the edges 36*a* of distal end 36 can be slit to allow a spring action.

Figure 4:
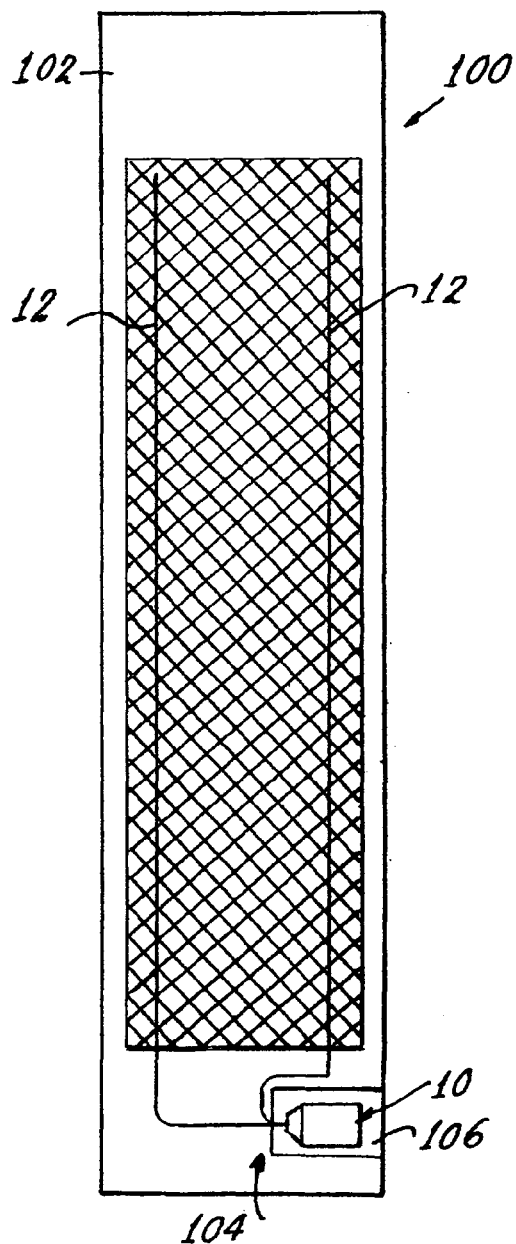
FIG. 4 is a diagrammatic plan view of an illuminable woven object.
Figure 5:
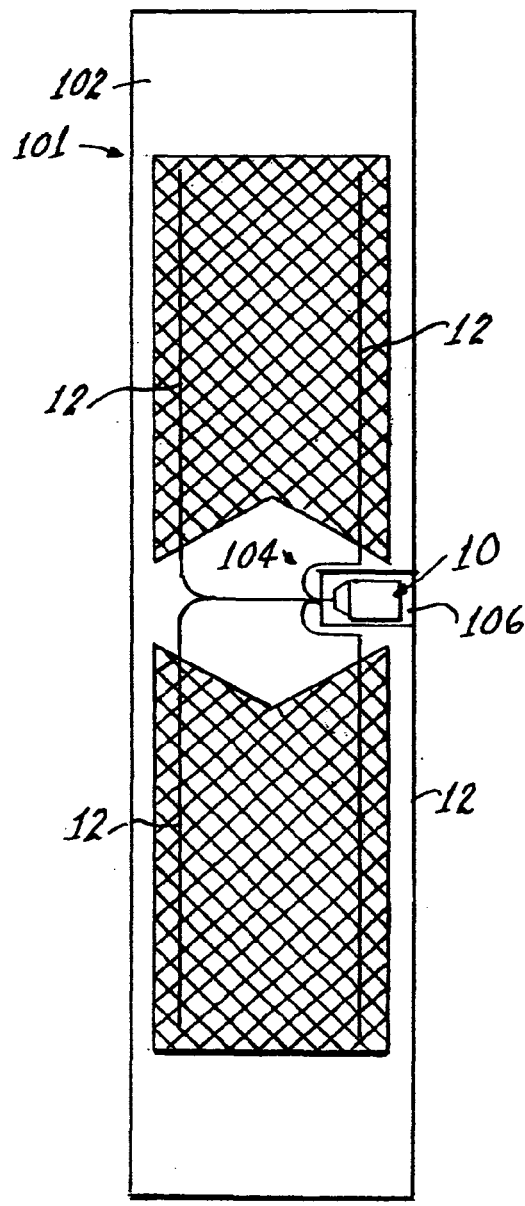
FIG. 5 is a similar view of a second illuminable object.

While the illuminator 10 described above has many uses, a preferred use can be with an illuminable woven object 100, 101 such as shown in FIGS. 4 and 5. The objects 100, 101 comprise a fabric 102 that contains a plurality of optical fibers 12 woven thereinto. For purposes of clarity only a few optical fibers 12 are depicted, it being apparent that greater or lesser numbers of optical fibers 12 can be used. A common terminus 104 is provided for the fibers 12 where they are collected into the fiber bundle 42. A pocket 106 is located adjacent the terminus 104 and contains the illuminator 10. The pocket can be placed in any desired location, such as at an end of the fabric 100 or in the center of fabric 101.

The main body of the optical fibers 12 can be linear, as shown, or they can be woven into any desired pattern consistent, of course, with the structural integrity of the fibers.

A method of illuminating a woven object thus can comprise the steps of forming a woven object 100 or 101 with a plurality of optical fibers 12 contained therein. One end, for example, 12*a*, of each optical fiber 12 is combined to form the fiber bundle 42, which is subsequently inserted into the distal end 36 of the optical coupler 26 contained within a pocket 106. The goal is to extract the highest output of the LED 22 into the optical coupler 26 thru the lens 34 and into the fiber ends 12*a*. The higher the extraction efficiency, the brighter the fabric will be.

The elongated woven objects 100, 101 are to be understood as exemplary only. For example, the small and convenient size of the illuminator 10, approximately 2½ inches square by slightly more than ⅜ inches thick (54 mm×61 mm by 10.52 mm) would allow its use with woven articles of clothing or back packs or purses, as other non-limiting examples.

While there have been shown and described what are at present considered to be the preferred embodiments of the invention, it will be apparent to those skilled in the art that various changes and modifications can be made herein without departing from the scope of the invention as defined by the appended claims.

What is claimed is:

1. An illuminator (10) for a plurality of optical fibers (12) comprising:
    a housing (14), said housing (14) being substantially flat with upper and lower surfaces and a thickness much less than its length or width and having at least one cutout (24*e*) formed in one of said upper and lower surfaces;
    first and second compartments (16, 18) in said housing separated by a printed circuit board;
    a battery (20) in said first compartment (16) and a single light source (22) in said second compartment (18) deriving power from said battery (20), said light source (22) being mounted upon said printed circuit board (24);
    a substantially U-shaped heat sink (24*b*) positioned in said first compartment (20), said heat sink (24*b*) having a bight (24*d*) affixed to said printed circuit board and legs (24*c*) extending from said bight, at least one of said legs (24*c*) being positioned in said at least one cutout (24*e*);
    an optical coupler (26) associated with said light source (22), said optical coupler (26) comprising a central body (28) arrayed along a light source axis (30) and having a proximal end (32) with a lens (34) adjacent said light source (22) and a distal end (36);
    two lateral projections (38) on said central body (28), said lateral projections (38) including mounting means (40) for affixing said optical coupler (26) to said printed circuit board (24);
    said distal end (36) being formed to accept an optical fiber bundle (42).

2. The illuminator (10) of claim 1 wherein said housing (14) includes a switch (44) electrically connected between said battery (20) and said light source (22) for actuating and deactivating said light source (22).

3. The illuminator (10) of claim 1 wherein said housing (14) includes a terminal (46) for the reception of a connector to charge said battery (20).

4. The illuminator (10) of claim 1 wherein said proximal end (32) of said optical coupler (26) is contained within said housing (14) and at least a portion of said distal end (36) extends beyond said housing (14).

5. The illuminator (10) of claim 1 wherein said distal end (36) is hexagonal in cross-section.

6. The method of illuminating a woven object comprising the steps of:
    forming a woven object (100) with a plurality of optical fibers (12) contained therein;
    combining one end (12*a*) of each optical fiber to form a fiber bundle (42);
    forming an illuminator (10) comprising a housing (14) having first and second compartments (16, 18) therein separated by a printed circuit board, said housing (14) being substantially flat with upper and lower surfaces and a thickness much less than its length or width and having at least one cutout (24*e*) formed in one of said upper and lower surfaces;
    installing a battery (20) in said first compartment (16) and a light source (22) in said second compartment (18), said light source (22) deriving power from said battery (20), said light source (22) being mounted upon said printed circuit board (24);
    attaching a substantially U-shaped heat sink (24*b*) to said printed circuit board, said heat sink (24*b*) having a bight (24*d*) affixed to said printed circuit board and legs (24*c*) extending from said bight, at least one of said legs (24*c*) being positioned in said at least one cutout (24*e*);
    forming an optical coupler (26) and associating said optical coupler (26) with said light source (22), said optical coupler (26) comprising a central body (28) arrayed along a light source axis (30) and having a proximal end (32) with a lens (34) adjacent said light source (22) and a distal end (36);
    at least one lateral projection (38) on said central body (28), said lateral projection (38) including mounting means (40) for affixing said optical coupler (26) to said printed circuit board (24);
    inserting said fiber bundle (42) into said distal end (36); and
    energizing said light source (22) to illuminate said woven object (100).

7. An illuminable woven object (100) comprising:
    a fabric (102);
    a plurality of optical fibers (12) woven into said fabric (102);
    a common terminus (104) for said plurality of optical fibers (12);
    a pocket (106) located adjacent said terminus (104), and an illuminator (10) for said plurality of optical fibers (12) positioned in said pocket (106) and operatively connected to said common terminus (104), said illuminator (10) comprising:

a housing (14), said housing (14) being substantially flat with upper and lower surfaces and a thickness much less than its length or width and having at least one cutout (24e) formed in one of said upper and lower surfaces;

first and second compartments (16, 18) in said housing separated by a printed circuit board;

a battery (20) in said first compartment (16) and a light source (22) in said second compartment (18) deriving power from said battery (20), said light source (22) being mounted upon said printed circuit board (24);

a substantially U-shaped heat sink (24b) positioned in said first compartment (20), said heat sink (24b) having a bight (24d) affixed to said printed circuit board and legs (24c) extending from said bight, at least one of said legs (24c) being positioned in said at least one cutout (24e);

an optical coupler (26) associated with said light source (22), said optical coupler (26) comprising a central body (28) arrayed along a light source axis (30) and having a proximal end (32) with a lens (34) adjacent said light source (22) and a distal end (36);

two lateral projections (38) on said central body (28), said lateral projections (38) including mounting (40) means for affixing said optical coupler (28) to said printed circuit board (24);

said distal end (36) being formed to accept an optical fiber bundle (42).

8. The illuminator (10) of claim 5 wherein the edges (36a) of said hexagonal distal end (36) are slit to provide a spring-action for the reception of said optical fiber bundle (42).

* * * * *